US008063928B2

(12) United States Patent
Krisbergh et al.

(10) Patent No.: US 8,063,928 B2
(45) Date of Patent: Nov. 22, 2011

(54) VIDEOPHONE SYSTEM AND METHOD

(75) Inventors: Hal M. Krisbergh, Meadowbrook, PA (US); Joseph E. Augenbraun, Princeton, NJ (US); Randell E. Jesup, Malvern, PA (US); Randall J. Gort, Malvern, PA (US); Maire D. Reavy, Malvern, PA (US); Navneeth Kannan, Westford, MA (US); Whitney D. Blackmon, Holland, PA (US); Richard W. Westerfer, Lower Gwynedd, PA (US); David E. Wachob, New Hope, PA (US)

(73) Assignee: Worldgate Service, Inc., Trevose, PA (US)

( * ) Notice: Subject to any disclaimer, the term of this patent is extended or adjusted under 35 U.S.C. 154(b) by 1482 days.

(21) Appl. No.: 11/514,216

(22) Filed: Sep. 1, 2006

(65) Prior Publication Data
US 2007/0120968 A1    May 31, 2007

Related U.S. Application Data

(62) Division of application No. 10/674,789, filed on Oct. 1, 2003, now Pat. No. 7,239,338.

(51) Int. Cl.
*H04N 7/14* (2006.01)
(52) U.S. Cl. ............... 348/14.01; 348/14.03; 348/14.08; 370/352
(58) Field of Classification Search .... 348/14.01–14.16; 370/352
See application file for complete search history.

(56) References Cited

U.S. PATENT DOCUMENTS

| 2003/0043787 | A1* | 3/2003 | Emerson, III | 370/352 |
| 2003/0169860 | A1* | 9/2003 | Chou | 379/88.17 |
| 2003/0214573 | A1* | 11/2003 | Oh | 348/14.01 |

* cited by examiner

*Primary Examiner* — Melur Ramakrishnaiah
(74) *Attorney, Agent, or Firm* — Morgan, Lewis & Bockius LLP

(57) ABSTRACT

System and method for providing personal videotelephony in which a plurality of videophones are connected to a communications network that is configured for transmitted video and audio communications. Each of the videophones typically includes a camera, display device, telephone keypad, speaker and microphone all of which are operatively connected. The videophones further include means for selectably receiving and transmitting signals over the communications network, which signals represent images and/or sound, and for selectably displaying the signals representing any received signals representing the images on the display screen, and for playing any received signals representing the sounds on said speaker. Means are also provided for selectably accessing a remote location, such as, but not limited to, another videophone, using information entered or selected by a user of the videophone, and to retrieve the signals representing the images and sounds being transmitted from the remote location. In one or more embodiments the present invention further includes at least one networks operation center to store information related to the operation of the videophones and to facilitate the operation of the videophones.

8 Claims, 4 Drawing Sheets

VIDEOPHONE SYSTEM AND METHOD

CROSS REFERENCE TO RELATED APPLICATIONS

This application is a Divisional, pursuant to 35 U.S.C. §120, of U.S. application Ser. No. 10/674,789, which was filed Oct. 1, 2003 now U.S. Pat. No. 7,239,338.

BACKGROUND OF THE INVENTION

This present invention is directed, in general to videotelephony and, more specifically, to a personal, portable video telephone system, apparatus and methods of operation thereof.

Traditionally, telephone and video communication systems have been bifurcated. Conventional telephone systems (or PSTN systems) operate at a bandwidth appropriate for voice communications, and typically provide spontaneous, point-to-point communications, such as two-way voice and data services, between two end users. Contrastingly video distribution systems (including cable television systems), operate at a much broader bandwidth than telephone systems, and are usually employed to broadcast pre-determined, high quality, full-motion video and audio concurrently to a plurality of subscribers.

It has long been felt that, if the best features of voice and video communication systems could be combined appropriately, fully interactive videotelephony would become feasible. Accordingly, given its apparent advantages, videotelephony has been the subject of commercial development by multiple entities, for many years. Although the first videophone appeared as early as the 1930s, a commercially viable videophone has yet to be introduced, even though significant efforts have been devoted to developing the same. This has been due, in large part, to the relatively high cost, complexity both in design and use, the inability to concurrently provide quality image and sound, and the inability to provide a network infrastructure capable of two-way communications with minimal signal degradation.

Current attempts at video telephony typically resemble traditional business telephone desk sets with the addition of a display monitor and a camera, as well as associated controls for operating the videophone. The cost of such devices is typically in excess of U.S. $1000, which is above the level of affordability for many users. This is compounded since it currently takes at least two videophones to make a video call. These devices are often relatively large, and not portable.

The quality of the image and sound is typically substantially less that what we have become accustomed to for our normal communications. Minimal capability, if any, is provided for accommodating different ambient conditions. Similarly, minimum capability is provided for different audio characteristic (e.g., canceling ambient noise and feedback within the audio signal, accommodating concurrent conversations by both parties to the call). Furthermore, the signal processing utilized, including the techniques used for compressing and decompressing the resulting audio and video signals, has not been optimized for a videophone application. As a result, the quality of both the transmitted and received video is much less than what is expected from a communications system. For example, varying ambient light conditions often result in over exposed and under exposed pictures. Movement of the user often results in both a significant degradation in image quality as well as the possibility that the camera can no longer capture the image of the user (e.g., outside of the limited range of view of the camera.)

In addition, videophones are typically very complex to use. In order to communicate with the various communications networks there is a complicated set-up process to configure the videophone to the particular communications network being utilized. Even if a videophone can work with multiple types of communications networks, they are far from "plug'n'play" with any network. In addition, the videophone must be located where it can be directly connected to the available communication network via an Ethernet or comparable connection. This severely limits the flexibility in locating and using the videophone where you want to use it as opposed to where it must be physically connected. Since a videophone typically uses traditional IP addressing, a user must enter a number such as 192.121.121.121. Such a number sequence is different from what we are accustomed to as a standard phone number. Current videophones are often very difficult to set up and use. There is typically no provision for the telephone services and applications such as caller id, call waiting, call forwarding, conferencing and the like that we have come to expect. Videophones are expected to work across long distances which encompass multiple networks and network infrastructures. Delays in transmissions and the presence of noise degrade the signal quality. Even though current videophones often advertise high frame rates and transmission speeds they do not typically achieve these speeds due to the limited upstream and downstream characteristics of the communications network. This results in degraded image and sound quality, jitter, lack of synchronicity between the voice and video, etc.

SUMMARY OF THE INVENTION

The present invention provides for a personal videophone communication apparatus, system and method that addresses these and other limitations of the prior art. The present invention has been designed in a manner permitting sub $500 pricing, increasing the possibility to deploy it in a ubiquitous manner. The present invention employs signal processing capabilities and techniques that have been optimized for a videophone application and the broadband infrastructure. The invention provides for easy adjustability of both the display monitor and the camera and has otherwise been ergonomically designed specifically for use as a videophone. It can be used in multiple ambient light conditions and in fact can be pointed almost in the same manner as a standard video camera to permit taking pictures of other objects or persons not sitting directly in front of the videophone. One embodiment of the invention provides for a portable unit that is wireless and can easily be moved to multiple locations. One embodiment of the invention provides means for monitoring the quality of the transmission path and reserving a suitable transmission path to make a video call. These and other aspects of the present invention which differentiate it from the prior art are set forth below.

DETAILED DESCRIPTION

System 100

Figure 1:
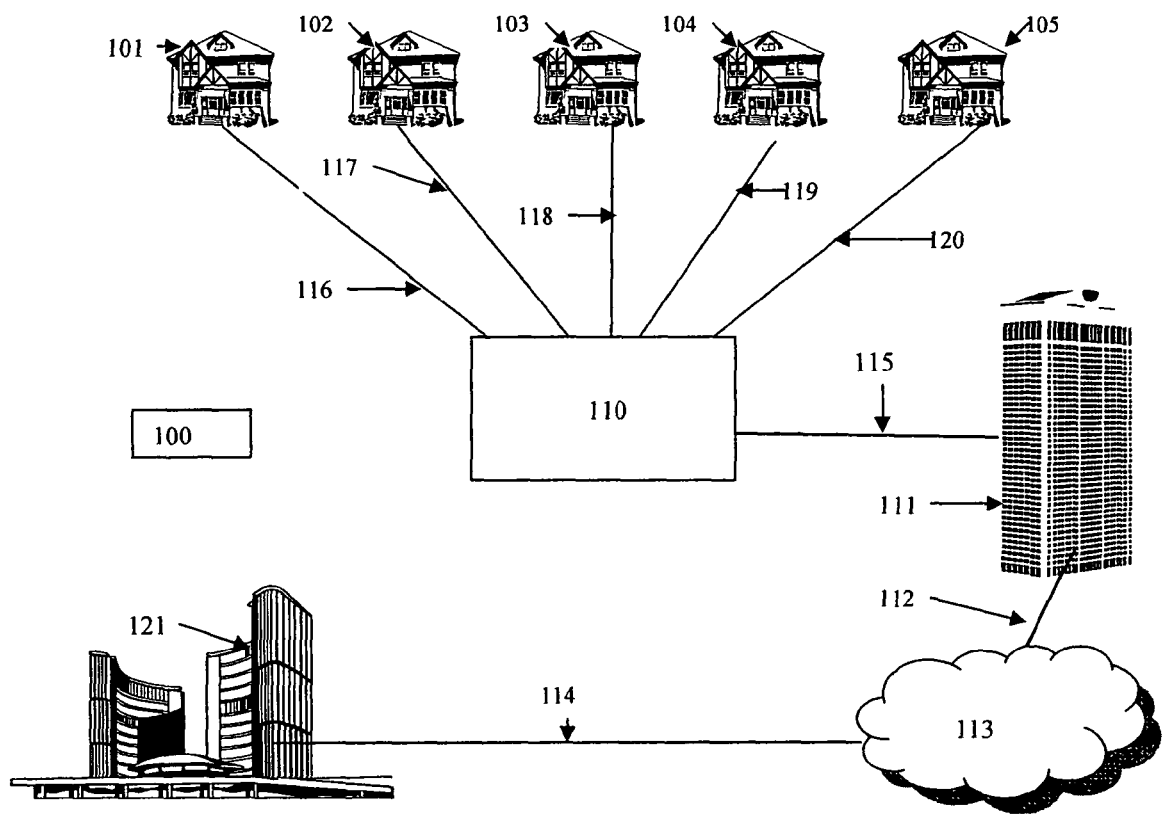
FIG. 1 illustrates a videotelephony system according to an embodiment of the invention.

For purposes of this specification, the term "configured" means having hardware and software operatively arranged to perform a specified function. As shown in FIG. 1, a video telephone system 100 according to the present invention comprises subscribers 101-105, configured to communicate via a communications network 110 such as a Community Access Television (CATV) network, an xDSL network, a WAN, LAN or other wired or wireless network (individually and collectively referred to herein as a "broadband network".) For purposes of this description, reference will be made to the CATV network 110 for simplicity; however, other types of communications networks, such as those referred to above, could also be utilized and referenced in accordance with the present invention. In one embodiment of the invention each subscriber 101-105 communicates with the network 110 via a corresponding communications medium 116 to 120. In one embodiment of the invention, the communications medium includes a coaxial cable such as is commonly utilized in connecting CATV subscribers. Other suitable communications media can include, for example, fiber optic cable, electrical power distribution systems, as well as wireless distributions, such as exemplified by the 802.11 standards, satellite and microwave. Combinations of these wired and wireless media can also be utilized. For example, in one embodiment of the invention, system 100 includes both an xDSL network and a CATV network, using fiber, coax and wireless communications media. In one embodiment of the invention, system 100 is configured such that each subscriber is capable of placing and receiving video calls and communicating with the other subscribers using one or more of the various available communications media. Accordingly, placing a call from subscriber 101 to subscriber 103 within a given CATV network would typically involve three network components, the communications medium 116 for subscriber 101, the interconnection CATV network 110, and the communications medium 118 for subscriber 103. One embodiment of the invention also includes at least one headend facility, such as CATV headend 111, which is connected to the network 110 through communications medium 115. The present invention is not however limited to calls within the CATV network 110 of a single CATV network headend 111. Rather, multiple (not shown) headends 111, and accordingly multiple CATV networks 110 can be interconnected. For example, such networks 110 can be interconnected via the Internet 113 and communication medium 112. In practice, multiple headends 111 will be interconnected, with such headends being geographically distributed. As is the case with CATV headends 111, the network between the subscriber and the headend 111 may include multiple intermediary nodes, with each node being a connection point for one or more subscribers on the network.

Although there are different topologies and technology suppliers for these communication networks components, which components and topologies well known to those skilled in the art, they all have a similar architecture at an abstract level. For example, in the case of the CATV network 110 the communications medium 117 for both the called and the calling party will include an incoming coax cable 229, a splitter 228 and a cable modem 227 (see also FIG. 2) typically located at the subscriber's home. For traditional video services televisions 230 will also be connected to splitter 228, either directly or through a cable converter (not shown). In addition, various headend components are also involved, such as a cable modem termination system (CMTS) located at the CATV headend or hub of the CATV system, and a router to direct or route the data packets through and between multiple networks 110. The CMTS is also used to provide connectivity between the Internet and cable modem. When a CMTS receives signals from a cable modem, it converts these signals into Internet Protocol (IP) packets, which are then sent to the router for transmission across the Internet. When a CMTS sends signals to a cable modem, it modulates the downstream signals for transmission across the cable to the cable modem. All cable modems can receive from and send signals to the CMTS but not directly to other cable modems on the line. Correspondingly, for an xDSL network there are also three main components, in this case, however, an xDSL modem is substituted for a cable modem and a Digital Subscriber Line Access Multiplexer (DSLAM) is substituted for the CMTS. The DSLAM is a system located at the phone company's central office or headend that links many customer xDSL modems and converts the signals from those modems to a signal that can be sent across the Internet.

These access network products are widely available from multiple sources and the design and operation of these access network components are well known to those skilled in the art. In particular, the requirements for the design and operation of CMTS products are defined in an industry specification known as the Data-Over-Cable-Service Interface Specification (DOCSIS). DOCSIS originated as a standard for providing data access via cable modems. Current releases of this specification have however been expanded to include methodologies to support voice communications. In particular, enhancements have been added to support embedded signaling for quality of service and to increase the availability of upstream bandwidth. The CATV industry has also introduced an additional specification known as PacketCable to provide data and communication services. The teachings of these specifications are incorporated herein by reference. Furthermore, various signaling protocol options and standards are also incorporated into these specifications, including but not limited to, DiffServ, H.245, H.248, H.263, H.264, H.323, LDP, MGCP, MPEG, MPLS, RTP, RSVP-TE, SIP, and SS7. These specifications, protocols, and standards are beyond the scope of the present invention but are likewise understood by those skilled in the art, and widely accessible. In particular, it should be noted that such SIP standards referenced above, provide for traditional and enhanced telephone functionality such as call waiting, caller id, call answering and the like. To facilitate this phone functionality and provide for network connectivity, a CATV or xDSL system will typically include various administrative components, including servers for provisioning the equipment, servers tracking usage and for billing, servers for controlling communications protocols and conditions (e.g., dialing, determining busy and available conditions, providing busy signals, interfacing with the various network components whether local or remote, servers for authenticating the calling and the called parties and for providing security for the call, etc. These components and technologies are again widely available from multiple providers and consist of technologies, components and systems that are likewise known to those skilled in the art and beyond the scope of the present invention.

The above discussion is important however to illustrate that the communication network is a collection of different technologies and network domains that are basically autonomous systems that are owned and operated by different administrative entities. Traffic from one user to another typically traverses one or more of the multiple domains and deployed technologies. Each of these domains is typically, however, only concerned with the performance and quality of its domain. Accordingly, the quality of service across multiple domains cannot be predicted, since like the weakest link of a chain, the overall quality of the network is governed by its weakest link. The lack of quality has been a major impediment to adoption of videophones and accordingly a solution to this problem is a focus of one embodiment of the present invention as will be discussed below.

Operations Center 121

In one embodiment of the invention each CATV headend 111 communicates with at least one network operations center (NOC) 121. In one embodiment of the invention, CATV headend 111 communicates with the NOC 121 via the Internet 113 and communications medium 114, although other communications networks and communications media, as previously mentioned, are also within the scope of the present invention. The present invention contemplates the NOC 121 being located remotely from the CATV headend 111, as well as within the CATV headend 111. In one embodiment of the present invention, each CATV headend 111 includes a processor, for example a personal computer (PC) or server (not shown) and memory means (not shown) for storing, retrieving and processing a local registry of accounts, which typically includes the telephone number and an IP addresses for each of a plurality of subscribers n which are connected to such headend 111. In one embodiment of the invention NOC 121 also includes a processor (not shown) and memory means (not shown) which host a master registry of subscribers in all CATV headends 111. Thus a back up registry is provided for the individual registries located within each of the CATV headend 111. In addition, the registry with the NOC 121 can provide overflow/backup storage for the CATV headends and the individual videophones 200. Such registries, whether located at the NOC 121 or a CATV headend 111 can include not only the subscriber names, telephone numbers, they can also contain profile information and other data associated with the subscribers, as will be further discussed below. This profile information can include the various preferences recorded as part of the start-up or provisioning process for the videophone 200 (see FIG. 2) such as the order and custom content of various menus and displays, the individual user directories, custom rings or backgrounds. Storage of this type of information at the NOC 121 permits it to be accessible by the subscriber at other locations and other videophones 200. Using standard Internet protocols and security techniques the information can be requested, retrieved and downloaded to a videophone 200. Such techniques also permit multiple users of a videophone 200 to have unique profiles, which can be retrieved. Not only does this provide for greater personalization of the videophone 200, it also minimizes the amount of local memory that it required as part of each videophone 200. Instead of storing the personal profiles, the videophone 200 need only store identification information and client software necessary to access and retrieve the profiles from the NOC 121. The present invention, however, contemplates the storage of data at the NOC 121 as well as within any videophone 200 or videophone interface unit 210 (See FIG. 2.) As contemplated herein the information can be selectively stored, sent and retrieved by or at the NOC 121 and the videophones 200, either on a manual and/or an automated basis. This transfer and storage of information can be accomplished through techniques known to those skilled in the art, including, without limitation, being referenced in the PacketCable specification discussed aforesaid.

In one embodiment of the present invention the NOC 121 also includes a registry that can correlate PSTN telephone numbers with IP addresses. In this manner a video call can be made to the same telephone number as has been assigned by the PSTN system, however the videophone call can be routed over the broadband network instead of the PSTN network as discussed herein.

Subscribers

Figure 2:
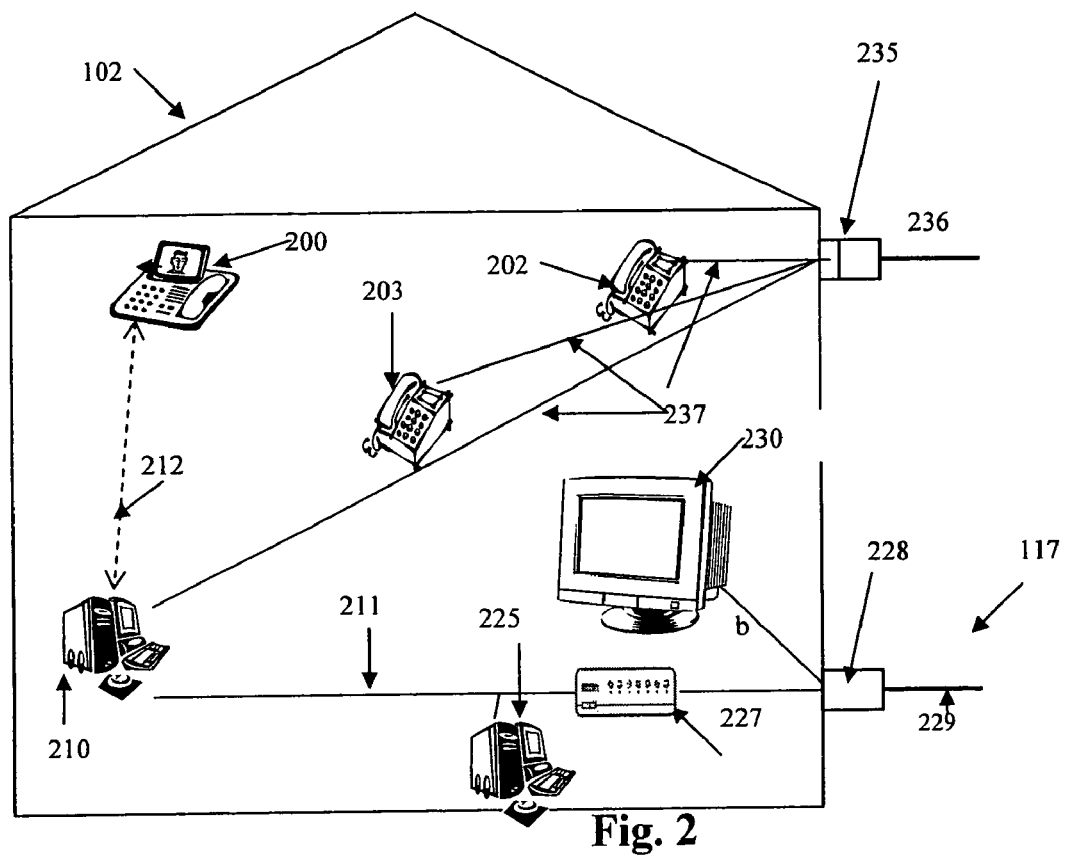
FIG. 2 illustrates an individual subscriber configuration according to an embodiment of the invention.

FIG. 2 illustrates an example subscriber 102 of subscribers 101-105. Although the term subscriber as used herein generally indicates a particular household, the same term is also used to refer the various members of a household that may use a videophone 200. For example, different members of a household can have different features and menus on their videophones 200, through the use of a log-on procedure. The subscriber system 102 illustrated in FIG. 2 represents but one of a wide variety of possible subscriber configurations according to the present invention. As illustrated, subscriber system 102 generally comprises the following components: videophone interface unit 210, phone trap 235, videophone 200, computer 225 and cable modem 227. In this embodiment videophone interface unit 200, computer 225 and cable modem 227 are configured to communicate as a Local Area Network (LAN) 211, 217. A LAN is a network that connects computing devices located within a small geographical area. Although FIG. 2 primarily illustrates a wired LAN, the present invention also contemplates the use of a wireless LAN.

In the illustrated embodiment the phone trap 235 and videophone interface unit 210 communicate via a typical connection interface such as that used with RJ11, and the Videophone interface unit 210, Computer 225, and cable modem 227 are configured to communicate via a typical communication interface such as that used with an RJ45 connection. Cable modem 227 represents an Internet Protocol (IP) address for purposes of Internet communication. In one embodiment of the invention, videophone 200 communicates with videophone interface unit 210 via a wireless connection. In another embodiment this interconnect could be wired (by way of example and not limitation, Ethernet or AC Power).

Videophone Interface Unit 210

The videophone interface unit 210 provides the main control functions for subscribers 101-105 to use the system 100. Generally the video interface unit comprises a processor and interfaces to connect the processor to the various networks (e.g., the RJ11 interface and the RJ45 interface.) In one embodiment of the invention, videophone interface unit 210 includes at least one audio/video Codec. The term "Codec" refers to an application or functional component adapted to code and decode a data signal according to a compression algorithm and the corresponding decompression algorithm. In one embodiment videophone interface unit 210 further includes at least one receiver/transmitter for communication with videophone 200, at least one Digital to Analog (D/A converter); and at least one Analog to Digital (A/D) converter. These components can be centralized or connected via the LAN 211, 217. It is important to note that while computer 225 and videophone interface unit 210 are illustrated as separate components from videophone 200, embodiments of the invention are possible wherein one or more of the components comprising the videophone 200 and the interface unit 210 are integrated into a single unit or a different configuration of multiple units. For example various components comprising the videophone 200 and the interface unit 210, such as the Codecs can be placed in either the videophone 200 or the interface unit 210, or within a single unit which includes the functionality of both the videophone 200 and the interface unit 210.

PSTN Telephones 202, 203

In an embodiment of the invention system 100 further includes one or more standard PSTN telephones (or POTS phones) 202 and 203, connected to a PSTN network 236. In one embodiment of the invention an incoming phone call to the phone number corresponding to videophone 200 will cause POTS phones 202 and 203, as well as videophone 200 to alert subscriber 102 (via ring or other alerting mechanism) regardless of whether the call is communicated via the RJ11 or RJ45 networks. In one embodiment of the invention an incoming phone call to the phone number corresponding to POTS phones 202 and 203, will cause videophone 200 as well as POTS phones 202 and 203 to alert subscriber 102 (via ring or other alerting mechanism) regardless of whether the call is communicated via the RJ11 or RJ45 networks. Videophone 200 and POTS phones 202 and 203 may have the same or unique phone numbers. In this manner the videophone 200 can be used to make and receive standard PSTN calls as well as video phone calls. This process is facilitated by the Phone Trap/Call Management functionality discussed below.

Phone Trap 235—Call Management

According to an embodiment of the invention, all phones ring on incoming calls. For any given call, videophone interface unit 210 sends and receives digitally encoded voice/video/signaling data to videophone 200 and analog encoded voice/signaling data to POTS phone(s) 202 and 203. The videophone interface 210 includes a phone trap 235, or PSTN isolation/bridge, is primarily used to interface the videophone 200 with other POTS phones. In the event this feature is not required, the phone trap 235 may be eliminated. In the event there is no available PSTN network, the interface unit 210 could also be adapted to include voice over IP ("VoIP") functionality to directly support all POTS phones 202 and 203 in the house. The phone trap 235 can either be included as an integral component of the videophone interface or as a remotely located component such as illustrated in FIG. 2. When implemented as a remotely located component, the communication between the phone trap 235 and the videophone interface unit 210 could be over Ethernet, wireless in one of several forms, over power-line networking, or control signals superimposed on the existing POTS phone lines within the house. The phone trap 235 would serve to isolate the phone lines within the house from the PSTN service to the house when needed, and bridge audio data (of either a videophone call or a audio only call) between the broadband network and the PSTN network. The actual construction of a phone trap 235 is known to those skilled in the art.

For example, if there were an incoming video call, videophone interface unit 210 would tell the phone trap 235 to isolate the house's phone lines from the PSTN. It would then tell the phone trap 235 to ring all the POTS phones 202 and 203 within the house, optionally with a distinctive ring. If a POTS phone 202 or 203 were picked up, the phone trap 235 would signal that fact to the videophone interface unit 210, which would then accept the incoming VoIP call and begin sending audio data to the PSTN network via the RJ11 interface.

If a video call is initiated from the videophone 200 or incoming video call accepted by the videophone interface unit 210, the videophone interface unit 210 would inform the phone trap 235 to isolate the POTS phones 202 and 203 from the PSTN network. If one of the POTS phones 202 or 203 is picked up, the interface unit 210 would gateway audio data to/from the POTS phones 202 and 203 and the videophone interface unit 210 so the person on the POTS phones 202 and 203 could take part in the audio portion of the video call.

If a PSTN call comes in to the phone trap 235 while the phone trap 235 has isolated the POTS phones 202 and 203 from the PSTN network 236, the phone trap 235 may inform the videophone interface unit 210 and/or the POTS phones 202 and 203 of this fact to implement a form of "call waiting." In this instance the videophone 200 may indicate call waiting visually as well as or instead of audibly.

If a POTS phone 202 or 203 handset were picked up when there is no active call, the phone trap 235 would connect it to the PSTN network to make an outgoing audio-only call. Optionally (or in the case of no PSTN connection), it could connect to the videophone interface unit 210 and initiate an outgoing VoIP, voice-only call over broadband network 229. The option of placing on an outgoing voice call on either the PSTN network 236 or the broadband network 229 (as a VoIP call) would be configurable. Another option would be for the phone trap 235 to examine the number dialed, and use either PSTN network 236 or the broadband network 229, depending on the number dialed (whether it's long-distance, whether it is a known video-enabled destination, or whether it is another videophone, a POTS phone or a VoIP phone.

Table 1 describes various types of subscriber call configurations as they relate to the operation of phone trap 235 and videophone interface unit 210 for outgoing calls.

TABLE 1

| Outgoing Calls | Phone Trap | Videophone interface unit | Type of Call |
| --- | --- | --- | --- |
| POTS to POTS | Closed | Routes to PSTN network | POTS audio |
| POTS to IP | Open | Routes to Broadband network | IP audio |
| Videophone to POTS | Closed | Routes to PSTN network | POTS audio |
| Videophone to IP | Open | Routes to Broadband network | IP audio |
| Videophone to videophone | Open | Routes to Broadband network | IP audio & video |

Table 2 describes various types of subscriber call configurations as they relate to the operation of phone trap 235 and videophone interface unit 210 for incoming calls.

TABLE 2

| Incoming Calls (to PSTN) | Phone Trap | Videophone interface unit | Type of Call |
| --- | --- | --- | --- |
| POTS | Closed | Routes to PSTN network | POTS audio |
| IP | Open | Routes to Broadband network | IP audio |
| Videophone 200 | Open | Routes to Broadband network | IP audio & video |

Videophone 100

Figure 3:
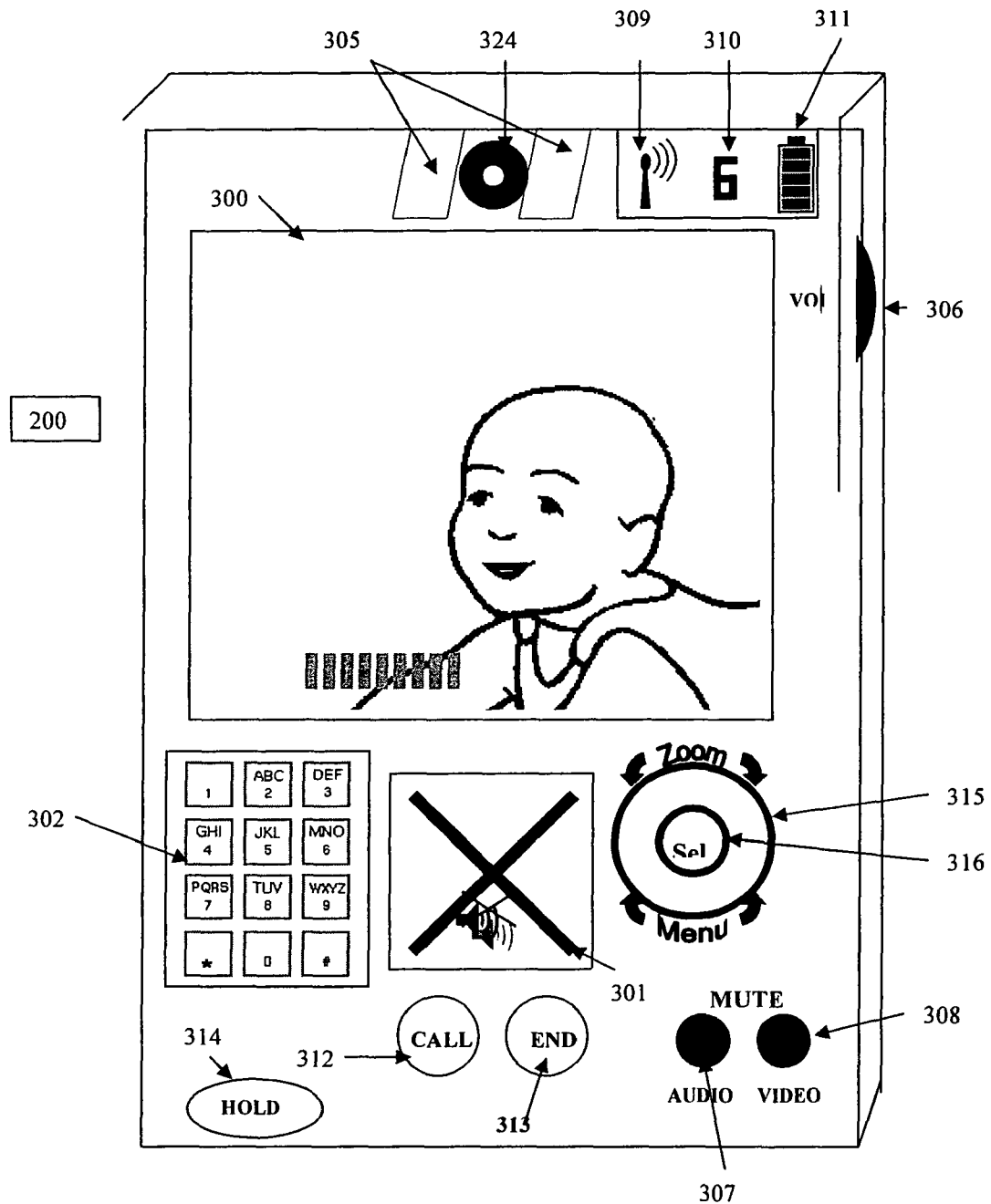
FIG. 3 illustrates one embodiment of a video telephone according to the invention.

One embodiment of videophone 200 is illustrated in FIG. 3, wherein videophone 200 is configured to communicate both audio and video information to and from subscriber 102. In one embodiment of the invention, videophone 200 is powered by a rechargeable battery having a separate battery charger/power source (not shown) and includes a DC power connector (not shown). In one embodiment of the invention videophone 200 includes a wireless receiver/transmitter (not shown) for communicating with videophone interface unit 210 (See FIG. 2). Videophone 200, as illustrated, includes a video camera (not shown) including lens 324; first display 300; second display 301, keypad (or other input device in which numbers and letters can be entered and/or selected by a user) 302; built-in microphone/speaker 305; a volume control 306, video and audio mute buttons 307 and 308 respectively; manual zoom/menu/select control 315; select button 316, range indicator 309, message indicator 310; power indicator 31; call button 312, end button 313, and a hold button/indicator 314. Although also not illustrated an embodiment of the videophone 200 could also include various input/output connectors such as (i) "audio/video in" for use with an auxiliary microphone/camera or for sending previously captured audio/video images, (ii) "audio/video out" for displaying and/or recording audio/video on other output/recording devices such as a large screen television or DVD recorder, (iii) smart card or other memory device connection for supplemental storage/retrieval of programming/audio/video images for the videophone 200 or for providing security and/or provision information for the videophone 200, and (iv) Ethernet or other broadband input/output for using the wireless capabilities of the videophone 200 for other LAN capable devices. The previously described connectors are by way of example and not limitation.

Camera

In one embodiment of the present invention the camera is a conventional CCD camera although other camera technologies can also be used.

Electronic Pan Zoom. In one embodiment of the invention, videophone 200 provides zoom, pan, and tilt features for the corresponding remote camera. In other words, each person on the call has the capability to zoom, pan, and tilt the camera of the party they are calling. In commercial videoconferencing systems this function is provided using a camera that has three motors in it—one to zoom in and out, one to pan side to side, and one to tilt up and down.

This type of mechanical solution is undesirable for a consumer device for several reasons. First, the cost is high. Second, the potential for mechanical malfunctions in the driving mechanisms is always present. Further, such mechanical devices are larger and heavier than is desirable for a portable device. Therefore, one embodiment of videophone 200 includes a fixed camera having a wide-angle lens 324. Behind the wide angle lens 324 is a camera that has several times the desired resolution. The camera includes electronic circuits configured such that camera is capable of operating in several modes. In a first mode, a zoomed out image is provided by taking the entire high-resolution image and converting it to the desired lower target resolution. In a second mode, a zoomed-in image is provided by taking a portion of the high-resolution image.

Selected portions of the resultant camera image field can also represent pan and tilt configurations. For example, the center 320.times.200 portion of a 640.times.480 image field is selected to represent max-zoom with centered pan and centered tilt. The upper-left 320.times.200 portion is selected to represent max-zoom with max pan to the right and maximum tilt upward. Note that panning is from camera's point of view. Therefore left and right are reversed relative to displayed image.

In one embodiment of the invention, the video camera lens 324 is wide angle and can include a lens distortion correction function for correcting distortion due to the wide angle of lens 324. In one embodiment of the invention lens 324 is telescopic. In one embodiment, the camera is moveable and/or removable to afford easily viewing other areas or materials not ordinarily positionable in front of the videophone 200, such as could be used to show a picture of a newly decorated room, a pet or a document. In one embodiment, the videophone 200 includes a software module for maintaining focus on and for tracking a primary image, such as a person, within a larger field of vision. This functionality is known to those skilled in the art and can be accomplished by multiple means including color identification, pattern recognition, etc. This same type of functionality can be used to provide voice and image recognition of the calling party. This is particularly useful when there are multiple users of a videophone 200, with each user have a different profile and different directories. With this functionality the videophone 200 can recognize a particular user and automatically provision the videophone 200 for that user. In one embodiment, the videophone 200 contains one or more LEDs or other light emitting devices to provide supplemental illumination of the objects or persons being photographed by the camera. In particular these LEDs can be low-powered, infrared LEDs such as are currently commercially available. In this embodiment the camera can also be selected to be sensitive to the infrared frequencies. Since infrared frequencies are generally not visible to the human eye, additional illumination can be provided on the subject without making the subject being bothered by the presence of the additional light.

Aperture Control Means. In one embodiment, the lens 324 has aperture control means (not shown) including the ability to fully close the lens. This latter capability may be accomplished electrically or mechanically such as with a moveable lens cover.

Display 300

According to an embodiment of the invention display 300 can be a conventional LCD, although other display technologies can be substituted. The display 300 can be used to display not only the images of the calling and the called parties, it can also be used to display the user interface for performing setup/operating functions for the videophone 200 as well as for displaying information related to use and operation of the videophone 200, including various supplemental information such as the current date and time, battery charge condition, in/out of range warnings for any wireless devices, condition/status of the communication network, condition/status of the videophone 200 and other similar related information. In addition the display can be used to display personal management type information as discussed below. In one embodiment of the present invention display 300 can be multiple screens, with each screens being used to display certain types of information, for example a separate screen or LCD for displaying the called and one for display the calling party. This can be done on a full screen basis or within frames or windows within the LCD.

In one embodiment of the present invention a standard, commercially available, rectangular LCD is utilized, however the LCD is rotated by ninety degrees. Since the videophone 200 of the present invention is intended to be a personal device a wide field of view is not required. Rather, in this embodiment the extra view space is electronically segmented and used to accommodate an upper and a lower viewing space. One of these viewing spaces can be used, for example, for displaying the image of the calling party and the other can be used to display the image of the called party. This provides a very cost effective and efficient use of currently available LCD technology.

Using standard video processing techniques any of the images or information displayed on the screen 300 can be processed to change size, format, brightness, contrast, color, to add or change backgrounds or to overlay text, graphics, or other information. Custom backgrounds or wallpaper and overlays can be stored locally as well as at the NOC 121 for display on screen 300.

Directory Functions.

Photo/image Directory. Videophone 200 includes a memory (not shown) in which can be stored, a directory including a plurality of subscriber names and corresponding telephone numbers. In addition, the directory can include one or more images or photos associated with a person, place or telephone number in the directory. In one embodiment of the invention, for example, videophone 200 can acquire an image of subscriber 102 as part of an initialization routine when subscriber 102 first uses the videophone 200. In this embodiment of the invention, upon a first user applying initial power to videophone 200 or otherwise commencing a first use of the videophone 200, the user can be prompted, for example by voice, or by text message, to pose for a picture. After this picture is taken, it can be stored in the memory of videophone 200 (or an associated memory device connected to one of the input/output connections. This picture can also be posted in a central repository, for example in operations center 121, so that other users who have the first user's name, address, or telephone number in their personal directory can also obtain an image of the first user in their directory. Alternatively, a control can be provided to selectably capture an image of the calling party during either a conversation or independent of any conversation or set-up process. If a videophone 200 is used by multiple users, provisions can be made to store images associated with each of the users. In another embodiment of the invention, the user can provide an image or images other than a picture of himself/herself taken by the camera of videophone 200, for example a logo or another type of multimedia presentation. The images/audio could be provided by a digital camera, PC, through the Internet or similar medium, or through the use of the various input/output connectors or smart card as discussed above. The selection and control of the use of these input/output connectors can be accomplished through the user interface and control mechanisms in a manner that is well known to those skilled in the art. Video/audio sources can be switched prior to, during and after a called as required to accomplish the desired purpose. Default and preference settings can be created and stored. This would include the ability to automatically override these settings as, for example, might occur when a signal is detected on the video/audio in connectors, such as might occur when a presentation stored on a VCR is played.

The videophone 200 can also include the capability to acquire an image and related information from an alternate directory (e.g. within the videophone 200 of the number being called or within a central depository such as may exist as part of the NOC 121 (See FIG. 1.)) This image and information can correspond to the name, address or number of the person or place being called. This information can be automatically or selectively provided to a caller when a call is placed or during the course of a call. In one embodiment, each videophone 200 therefore has the capability to interrogate (directly or through the use of the NOC 121) the registry of another videophone 200 to determine relevant information about the user of that videophone 200, and to appropriately retrieve, utilize and store such information as appropriate. Alternatively, a control can be provided to selectably capture an image being transmitted by the called party during a conversation with the called party. This latter embodiment can be facilitated with user prompts such as "This caller is not currently part of your directory, if you wish to add, please press "*"." Such prompts can be displayed on screen 300. Once obtained this information can be added to a speed dial or other directory of numbers called or to be callable. As with all of the directories/information functions discussed herein this information can be stored and retrieved as part of the videophone 200 (e.g., in memory), locally in a companion storage device (e.g., smart card) or remotely as part of the NOC 121 or other remote storage. Preferably any capture of information is accomplished in a manner that doesn't interfere with an ongoing phone call. Also care needs to be taken to capture adequate information to afford the retrieval and playback of the captured information. Thus, for example, it will likely be necessarily to capture one or more "I" frames (as defined in the MPEG standards as referenced above.

Accordingly this invention provides the ability for both the called party and the calling party to have their images available for display either as part of a directory of numbers to call or a directory that of the numbers that have called (e.g., as part of a caller id service such as is discussed below.) In one embodiment, the image capture and/or transfer takes place during a special transaction just for that purpose. In an alternative embodiment of the invention, the image capture and/or transfer takes place during the course of a videophone call.

It should be noted that the image captured or information stored may consist of a still image (e.g., a single frame of information) or a full sequence of images and audio, depending upon the amount of memory allocated to image storage. Once stored this information can be selectively played back through the user interface and controls of the videophone 200. This information is useful not only for personal directories but also for other applications and services (e.g., Mail, CallerID, etc) as will be discussed below. The actual capture, storage, retrieval and playback can be accomplished by techniques well known to those skilled in the art.

White/Yellow Page Type Directories. In another embodiment of the invention, the videophone 200 can be used to display standard directory information retrieved from a remote depository. This depository for directory information can include both what are commonly referred to as "white page" and "yellow page" information. Using standard Internet protocol and applications, this directory information can be searched and/or filtered to permit a display of pertinent information on the display device of the videophone 200. For example, a user could enter a directory request, identifying the first few letters of someone's last name, such as "SMIT" and receive a paginated listing of all persons with a last name beginning with the entered letters. In this embodiment the user could also, for example, request yellow page information for "TIRES" and receive a listing of providers of tires. Having an on-line depository for this directory information can be very useful since it can easily be maintained current. Furthermore, the online availability of this information obviates the need to store what are often cumbersome, and usually outdated, hard copy directories. This type of information already exists and is readily available online. In addition, standard display techniques can be used to enlarge the print, or to use standard text to audio conversion techniques for people with hearing or vision disabilities. It is also possible to localize the information retrieved. For example with yellow page information, using standard data processing techniques, it is possible to identify the geographic region of the user (e.g., by identifying the particular cable or telephone subscriber or at least the local node serving the cable subscriber) and further filtering or otherwise processing the information retrieved to supply either solely or on a priority basis providers that are closer to geographic location of the user. Furthermore videophone 200 can be used make available both audio and video information to its users. For example the selection of a specific yellow page entry for Tires could display a current video advertisement or map information for that particular tire dealer as further described below.

System Directories. In one embodiment of the present invention system directories of all registered users can be maintained at the NOC 121. Not only could these system directories contain the information necessary to match a telephone number with an IP address as described above, such directories could also contain stored picture information for the individual users as well as provisioning or profile information and information relating to such users' availability to receive a phone call or message as further discussed below with respect to supplemental information and services.

Personalized Directories. In addition to standard white page/yellow page type information, personalized telephone directories can also be stored, either automatically or selectively by the subscriber. Such personalized directories can include, last numbers called, last numbers calling this phone, speed dial directories, categorized directories such as family, business, children's, etc. Such directories can be stored locally or as part of the process and techniques discussed above with reference to the NOC 121. Such directories can include images as well as names and telephone numbers. In addition one embodiment of the present invention provides for the storage and retrieval of additional information such as notes that may be associated with the various entries, for example, "remember to call Martha tomorrow and wish her a happy birthday", or "the name of Frank's wife is Jane". These notes can be displayed as an overlay on screen 300 during a call with the particular party. In an embodiment of the present invention, this information can be downloaded from or to other devices such as personal computers, cell phones, PDAs, etc., through the various input/output connectors referenced above.

Automated Directory Management. In one embodiment of the present invention traditional caller id functionality can be used to identify a calling telephone number. This telephone number can be compared to information contained in the White/Yellow page directories, the system directories, and the personalized directories to automatically cross check the information, to add a stored picture or to personalize the information displayed (e.g., even though the calling number is registered to John Smith, the videophone 200 can display a picture of John's wife Mary (and Mary's name or nickname), who happens to be the sister of the party being called, and often more appropriately identified as the calling party rather than her husband John. Similarly customized video alerts or "rings" can be created or retrieved, and stored for particular calling parties.

Supplemental Information and Services. It is also possible to provide more information than the photo, name, address and phone number of the applicable providers. The system of the present invention call allow the user to request and/or the system 100 to provide relevant full motion video which could contain advertisements, training or support information (e.g., how to read and interpret tire information from the side of your existing tires, directions to the provider, etc.). Furthermore, these techniques can be utilized to allow the videophone 200 to provide what are commonly referred to as personal information management tools such as calendars, to do lists, notes, etc. Such tools can be personalized for individuals users using the techniques described above with respect to the NOC 121. In an embodiment of the present invention, this information can be downloaded from or to other devices such as personal computers, cell phones, PDAs, etc., using the LAN 211, 217 and the various input/output connectors described above that can be included as part of the videophone 200.

In addition the present invention is particularly suited to provide access to desired supplement information and services such as news, weather, sports, horoscopes and the like. This supplemental information can be selectively accessed by the user through a menu option. This can be done during set up or provisioning or it can be a spontaneous request. The information can be retrieved and displayed at the time of the request, or it can be requested in the background and displayed during times when the videophone 200 is not being used for calls, or even as an overlay or window during a call. For example, during times when the videophone 200 is not being used for a phone call it can display the local weather and current news updates. This information can also be localized based upon the telephone number associated with the videophone 200. The videophone 200 can also be programmed to display a customized multimedia presentation at a selectable time such as could be utilized for a wake-up alarm or as a message for the children when they arrive home from school. Again, the information for such presentations could be stored locally, remotely or download from a service.

Furthermore the same systems, apparatus and techniques can be used to deliver messages such as currently being sent with instant messaging services. Also in a manner similar to instant messaging, one embodiment of the present invention allows the subscribers 101-105 to send a message to the NOC 121 indicating their availability to receive an incoming call or message. With this information standard processing techniques can be used to create "buddy lists" such as are used with instant messaging. The "buddy lists" are created in association with the information contained in your personal directories, indicating which of the entries within your personal directories are available for a video or audio call, or to receive a message.

Similarly other data type services and applications can be easily adapted for, and take advantage of the significant functionality of the present invention. For example the videophone 200 can be used to receive video faxes, to display advertisements, to serve as virtual picture frames for either stored or transmitted images, to serve as a player for streaming multimedia entertainment, to interface with home security systems and display other camera images (e.g., someone at the door). These applications can use the videophone 200 not only as a display (and audio reproduction device) but also as a source where the camera and microphone can be turned on remotely for example as for security applications such as a nanny cam.

Video Voice Mail

In one embodiment of the invention, videophone 200 provides a video enabled answering machine function. When a video call comes in, if the receiving party is either unavailable (as detected by waiting a predetermined number of rings), or if the receiving party is on another call, videophone 200 provides a message to the calling party. This message may be either a default message, e.g., "The party at phone number xxx-xxxx is busy right now, please leave a message") or a previously recorded custom message by the receiving party. In either case, the message can include both audio and video information. In one embodiment of the present invention multiple messages can be stored, especially through the techniques describe above in the section entitle Network Operating Center 211. These messages can be different for the various users of a videophone 200, and they cab be tailored to be unique for one or more particular calling parties (as recognized by the caller ID functionality as described below).

In one embodiment of the invention, videophone 200 is configured such that the calling party can leave a message comprising video, audio, or a combination of video and audio information. When the receiving party plays the message back, conventional voice mail functions are available, such as selectively deleting messages, saving messages, forwarding messages, etc. In addition, according to the invention, VCR-like functionality is also available during message playback, including fast forward and reverse scan, pause, and slow motion. In one embodiment of the present invention an incoming audio only caller can default to leave an audio voice mail, while an incoming video caller can default to leave a video/audio voice mail.

The video voice mail messages may be stored within the videophone 200 or remotely such as at the NOC 121. Through traditional techniques message indicator can be provided to inform the user of the existence of mail and the incoming mail can be retrieved, saved and deleted through the user interface and control system of the present invention. Similarly custom outgoing messages can be stored, retrieved, edited and deleted. Through the use of the NOC 121, remote access to these functions is also possible from other videophones 200.

Video Caller ID

Conventional caller ID functions provide the phone number and name of the calling party. The techniques for providing this standard functionality are well known to those skilled in the art. Embodiments of videophone 200 are configured to provide the conventional caller ID functions. In addition, however, according to an embodiment of the invention an image related to the incoming call is provided by a caller's videophone 200. For example, the image presented by the calling videophone can be a person's face. Alternatively, the image can be a business logo, or other type of image. The image can consist of a single frame of information or a multi-frame, multimedia presentation. In any case, the images/audio can be displayed on the receiving party's phone.

Embodiments of the present invention can combine the caller ID functionality with the automatic directory techniques of the present invention to proved enhanced services as discussed above. For example this combination provides the ability to differentiate audio calls and callers from video calls and callers and modify the caller ID alerts accordingly.

Using the Videophone 200:

Placing the call. Referring now to FIG. 3 a telephone call can be made in multiple ways.

A telephone number can be entered in the traditional manner using the numerical keypad 302. The numbers pressed by the user will be displayed in sequence on screen 300. At any time, the "End" button 313 may be used to cancel the numeric entry and clear the user interface of any previously entered numbers. Upon the completion of entering the numbers, the "Call" button 312 is used to initiate the call. The user interface then provides feedback that the call is in progress.

Alternatively, the Call button 312 can be pressed prior to entering any numbers with the numeric keypad 302. In either case a "Dial tone" can be sounded through the headset or speaker of the videophone 200.

Alternatively, the rotary dial 315 can be moved to awaken the videophone 200 from a standby state. Similarly, any of the buttons on the numeric keypad 302 can be pressed to awaken the videophone 200 from the standby state.

In a first embodiment, when the videophone 200 is awakened from the standby state the user interface appears on the screen 300, displaying, as an example, the following menu options as illustrated on FIG. 3:

Number being dialed if entered from numeric keypad.

Redial—Menu item that displays a listing of the last "n" numbers that have been called Caller ID—Menu item that displays a listing of the last "N" numbers that have called the user User Set-up. Menu item that displays additional menu items to allow the user to configure his videophone 200.

Speed dial—Menu item that displays a user entered telephone directory, e.g., the names, phone numbers, and icon-sized photos of the persons/entities likely to be called.

The rotary dial 315 can be rotated in a clockwise or counter clockwise direction to highlight each menu option. Depending upon the extent and direction of rotation any of the menu items can be selected. As the rotary dial 315 is rotated, the user is provided visual feedback as each menu option currently active is highlighted or otherwise provided with special treatment on screen 300. The user then presses the select key 316 on the rotary dial 315 to select the active menu option. Upon selection of a menu item the function specified by that menu item is performed. For example if the menu item "Redial" is selected, a subsequent screen of information is displayed on screen 300 listing the last "n" numbers that have been called by the user. The rotary dial 315 and select key 316 can then be used to select a particular telephone number. Upon selection of a telephone number in this manner, the videophone 200 will place a call to the selected number.

Receiving the call. The videophone 200 is typically left in a standby mode. Upon a first ring, the unit wakes-up putting the screen 300 in an active display mode. The screen 300 will indicate the telephone number, image of the calling party (if stored) and other relevant information for the incoming call. To accept the call, the "Call" button 312 is depressed.

During the call. A full-duplex audio conversation is available. Screen 300 displays the live image of the calling party. Screen 301 can be used to display a self-image taken by the camera and lens 324. Using standard video processing techniques the self image is typically a mirror image of the actual camera image.

The speakers on the unit (speakerphone speaker or handset) are used to hear the call. The user has the option to adjust the volume of the speakerphone or handset using rotary dial 315, or a separate volume control 306 can be provided. In addition, the user can use the audio mute switch 307 to mute the microphone 305 or the microphone of the handset. Similarly, the video mute switch 308 can be used to either turn off the camera or close the aperture of the lens 324 to prevent a self-image from being taken.

Ending the call. A telephone call can be ended by replacing the handset on the cradle or by pressing the "End" button 313 on either unit and/or handset. Immediately after ending a call, video and audio ceases. Immediately after ending the call, the screen 300 may display an animation indicating that the call has ended. The animation may include text indicating that the call has ended. Immediately after the animation has stopped the unit shall go into standby mode.

Quality of Service

Figure 4:
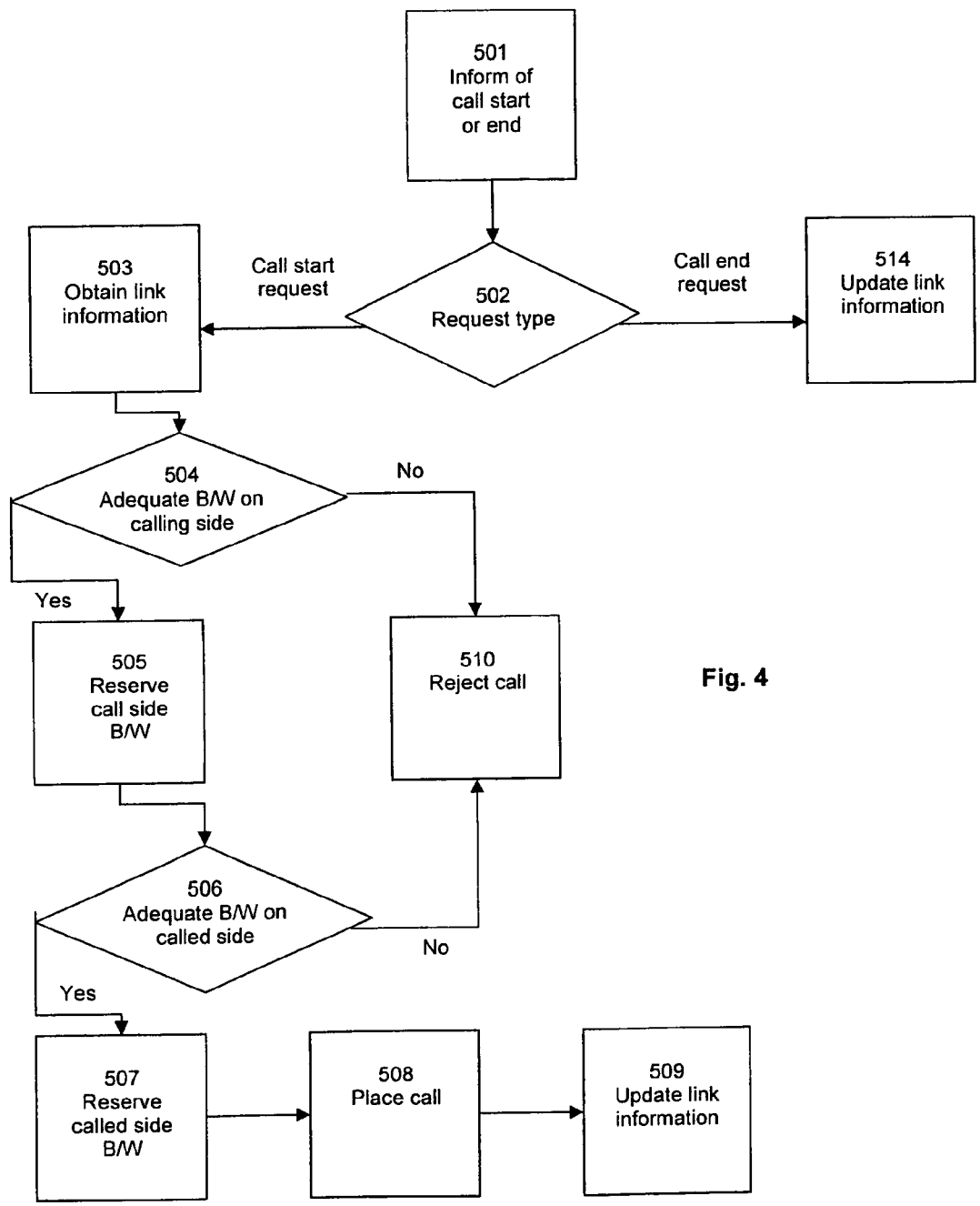
FIG. 4 illustrates various process steps for ensuring adequate quality of service according to the present invention.

One of the concerns in providing a videophone service is the quality of the sound and images presented. As is apparent from the prior discussion of the complexity and non-uniformity of the communications network there are many variables which can be introduced that will affect the quality of service, and result in such effects as packet loss, latency and jitter. A number of these variables are dependent upon the amount and quality of the bandwidth that is allocated to each videophone call. Overloading the available bandwidth in any segment of the communications network can result in a reduction in quality of all of the calls utilizing that communications network segment An embodiment of the present invention includes means for determining the potential communication network segments linking the calling and the called number, and means for interrogating these segments to determine the available bandwidth of the segments, and if sufficient quality bandwidth is available, means for reserving such bandwidth in anticipation of the completion of the call. Furthermore if sufficient quality bandwidth is not available, the process can be repeated until sufficient quality bandwidth is available, or the caller can be informed that the call cannot currently be made or can only be made with potentially reduced quality. The process for accomplishing this is illustrated in FIG. 4. This process is initiated by the interface unit 210, which informs the NOC 121 that a videophone 200 is either trying to make a call (step 501.) Both the calling and the called number are transmitted to the NOC 121, and the registry at the NOC 121 is queried as to the required link segment information for these two numbers, i.e., the associated communications media 116-120 links, and the possible communication network 110 links (step 503). A determination is made as to the availability of sufficient quality bandwidth to complete this call (steps 504 and 506) on these segments. If such bandwidth is available the links are reserved and the call is completed (steps 506, 509). When the call is terminated the interface unit 210 informs the NOC 121 and link information is updated (steps 502 and 511.) These same techniques can be used to provide quality of service on a per link segment basis as well as throughout the entire required connection. Also some segments may not allow the reservation of bandwidth but rather give prior to video call data through such mechanisms as are provided by DiffServ as referenced above.

What is claimed is:

1. A videophone system including a plurality of videophones, wherein at least one videophone is connected to a videophone interface unit, the system comprising:
   an adapter connected to and configured for affording communication with said videophone over a PSTN network or over a broadband network;
   processor means for selectably linking said videophone to said PSTN network or to said broadband network, wherein the videophone can selectably receive and make calls on the PSTN network or the broadband network; and
   an operations center connected to said broadband network and having means for storing information related to at least one user of said videophone,
      said operations center being configured to communicate with said videophone over said broadband network,
         wherein said operations center includes means for determining information indicating whether a calling and a called party each have a videophone, and means for communicating such information to said videophone interface unit, and
            wherein said videophone interface unit includes means for selectably routing a call over said broadband network or PSTN network.

2. The videophone system of claim 1 wherein said videophone system includes at least one PSTN telephone which is connected to the PSTN network and to the videophone interface unit, and
   wherein said videophone interface unit includes means for both the PSTN telephone and said videophone to alert a user when there is an incoming call on either the PSTN network or the broadband network.

3. The video system of claim 2 wherein said videophone interface unit includes means for isolating said PSTN telephone from the PSTN network.

4. The videophone system of claim 3 further comprising means for using the same telephone number for said videophone and said PSTN telephone.

5. The videophone system of claim 1 wherein the videophone interface unit includes means for causing an incoming call on the broadband network to have a different alert on said videophone than an incoming call on the PSTN network.

6. The videophone system of claim 1 wherein said videophone interface unit includes means for selectably routing an audio and video call made on said videophone over the broadband network, and an audio only call made on said videophone over the PSTN network.

7. The videophone system of claim 1 wherein said videophone interface unit includes means for selectably routing an audio and video call made on said videophone over the broadband network, and an audio only call made on said videophone over the broadband network as a voice over internet protocol (VoIP) call.

8. A method for providing a connection using a videophone system including at least one videophone, said method comprising:
   configuring the videophone for communication with a PSTN network or a broadband network;
   determining which of the PSTN or broadband networks to use for routing a call from a calling party to a called party based upon whether the PSTN or broadband network is available to the called party, or determining which of the PSTN or broadband networks to use for routing the call based upon which of the networks is used by the calling party;
   storing information related to at least the calling or called party in an operations center connected to the broadband network,
      said operations center being configured to communicate with the videophone over the broadband network,
         wherein the operations center includes means for determining information indicating whether a calling and a called party each have a videophone, and means for communicating such information to a videophone interface unit, and
            wherein said videophone interface unit includes means for selectably routing a call over the broadband or PSTN network.

* * * * *